219-121 SR
8/10/82 XR 4,344,126

United States Patent [19] [11] 4,344,126
Schumacher [45] Aug. 10, 1982

[54] LOW RIPPLE D.C. POWER SUPPLY

[75] Inventor: Berthold W. Schumacher, Dearborn, Mich.

[73] Assignee: Ford Motor Company, Dearborn, Mich.

[21] Appl. No.: 193,565

[22] Filed: Oct. 3, 1980

[51] Int. Cl.[3] .......... H02M 7/06

[52] U.S. Cl. .......... 363/126; 363/141; 219/121 EB; 219/137 PS

[58] Field of Search .......... 219/121 EB, 137 PS; 336/5, 182, 183, 184; 315/205; 363/126, 44, 141, 45

[56] References Cited

U.S. PATENT DOCUMENTS

| | | | |
|---|---|---|---|
| 2,881,383 | 4/1959 | Michaelis | 363/126 X |
| 2,965,805 | 12/1960 | Steinert | 315/205 |
| 3,102,976 | 9/1963 | Blair | 363/44 |
| 3,657,724 | 4/1972 | Feeley et al. | 219/137 PS |
| 4,156,897 | 5/1979 | Vigh et al. | 363/126 |

*Primary Examiner*—William M. Shoop
*Attorney, Agent, or Firm*—Frank G. McKenzie; Donald J. Harrington

[57] ABSTRACT

A high voltage power supply used to transfer three-phase a.c. energy to d.c. at full rated power over a large range of output voltages. The electric and magnetic circuits are arranged according to the core type of construction wherein three legs of the iron core extend axially and have the primary coil wound along their full length. The core legs are joined for magnetic circuit continuity at the extremities. A plurality of high voltage decks each having three secondary winding modules mounted and interconnected are stacked axially over the axially extending iron core pieces. The secondary coils on each high voltage deck are interconnected in several three-phase connections, to produce a phase shift in the ripple of the d.c. output voltage of the various decks. A high voltage bridge rectification circuit mounted on each deck produces full wave rectification of the ouptut. Each high voltage deck provides a contact which is engaged selectively by contacts mounted on an axially extending rotary switch whose angular position varies the interconnections of the high voltage decks to produce a range of output voltages at the full rated power of the transformer. A counterbalance circuit to reduce any residual voltage ripple component at multiples of the input frequency includes the application of an a.c. voltage of proper phase and amplitude supplied at the ground return lead of the series-parallel connected high voltage decks. The counterbalance voltage is applied by way of an additional secondary winding of a few turns coiled over the three legs of the transformer core, but is completely independent of the primary and secondary windings. The number of turns of the additional winding and the leg from which the voltage is taken are determined empirically.

18 Claims, 19 Drawing Figures

LOW RIPPLE D.C. POWER SUPPLY

BACKGROUND OF THE INVENTION

1. Field of the Invention

This invention relates to a high voltage power supply. It pertains more particularly to a transformer and rectifier set that converts three-phase a.c. energy to a range of d.c. voltages at the full power rating of the primary coil and core. The device will produce a low ripple voltage source that is particularly well suited for energizing electron beam generators used for welding, heat treating and other metal working processes.

2. Description of the Prior Art

Electron beam welding and heat treatment of metals, which includes surface hardening, vacuum melting, and degassing is performed with an electron beam generator whose power source provides between 30 kV and 200 kV d.c. Whether a particular metal target will melt when struck by an electron beam moving across its surface depends on the magnitudes of the beam power and the power density. If the power density is low, the beam energy can be carried away by heat conduction so that no melting occurs. If the power density exceeds a critical minimum level instantaneous melting will occur and only a negligible amount of the energy will be lost by heat conduction. At an even higher threshold of power density, instantaneous evaporation will occur. At intermediate power densities some condition between these extremes will be encountered.

A workpiece cut or welded with an electron beam will look drastically different if the beam has barely enough power to cause melting compared to the result produced by a higher power beam capable of producing instantaneous melting. The melting rate depends on welding speed and beam power density; the power density of an electron beam in air and in metal vapor depends upon the distance it has travelled. Therefore, the depth or thickness through which the beam can cut or weld depends on the speed at which it passes over the surface of the metal target, the beam power density and the distance of the beam source from the workpiece. A lower power beam will not make the same cut or produce the same weld quality as a high power beam simply by moving it slower across the workpiece. Thus, when supplied with power of large magnitude an electron beam can make narrow and deep welds in air with profiles approaching those of welds made in a vacuum.

Electron beam guns from which the electron beam is directed and focused on the workpiece are supplied with d.c. power. When the d.c. power source is not steady but fluctuates about some mean d.c. voltage, the focal point of the electron beam will correspondingly vary from its target position on the workpiece. It is crucial to the correct, predictable operation of an electron beam welding device, therefore, that the power supply provide d.c. voltage with little or no ripple.

The voltage source that powers electron beam guns should have the capacity to produce a range of voltages whose magnitude varies depending on the application. For example, a power source for delivering large magnitudes of power at low voltage is required for heat treatment of large workpieces because rapid energy input over the full surface area will assure rapid self-quenching as the heat is conducted through the workpiece away from the heat treated surface. The power source for use where self-quenching is essential will deliver perhaps 20 to 60 kW at 30 kV. Larger magnitudes of beam power at higher voltages, typically 60 kW or more at 175 kV, are advantageous for electron beam welding in air. Such a power source will produce a beam that heats the air and metal vapors in the space between the beam source and the workpiece to enormous temperatures. This heating produces a rarefaction of the gases and vapors that reduces beam scattering effects. Therefore, the power density of the electron beam can be maintained at maximum levels even though the distance from the beam source to the workpiece target is large.

The power supply for an electron gun capable of welding, heat treating, melting and degassing of metals must provide a wide range of voltages at the full power rating of the device. Preferably the power source will produce the voltage range up to the rated power of the device without having to alter the configuration of the power source.

U.S. Pat. No. 3,418,526 discloses a compact high voltage power supply suitable for an electron beam welder. The supply includes a network for converting voltage received from a motor-generator set to produce an output voltage of 150 keV. The network is enclosed in a container which is filled with a gas of high dialectic strength. The voltage converting network includes a step-up transformer to convert the generated voltage to an intermediate voltage, a voltage multiplying network composed of an a.c. capacitor chain on the input side and a d.c. capacitor chain on the output side and a voltage rectifier chain connected in a voltage multiplying relationship with the capacitors.

U.S. Pat. No. 3,914,575 describes a power supply device for the operation of a gas discharge container used for the treatment of metallic workpieces. The device includes a transformer and rectifier for producing operating voltage for the alternating or three-phase current supply with continuous regulation of operating voltage.

SUMMARY OF THE INVENTION

Although electron guns can be readily adapted to generate an electron beam when supplied with power over a range of voltage, there exists no commercial power supply of practical size able to supply electron guns with large magnitudes of d.c. power at high voltages. The transformer and rectifier set according to this invention will deliver high d.c. voltage and power without use of discrete capacitors. The power supply is compactly packaged and easily movable on casters. This object is realized by way of a unique arrangement of the secondary windings located over the primary windings that are wound around axially extending legs of the iron core. The transformer is pressurized with a gas such as SF6 having high dielectric strength to further reduce the size of the unit from what could otherwise be required of a conventional high voltage power supply having the same voltage and power rating.

The output voltage from any power supply can be reduced by dropping the input voltage but this will reduce the amount of power that can be delivered by the unit. Conventional power supplies are encumbered by this limitation. The power supply according to this invention is able to deliver the full rated power of the primary windings and core over a range of voltages that extends into the high voltage range required by electron beam welding equipment. A motor-generator set supplies the primary windings with polyphase electrical power. Secondary windings having a diverse number of turns packaged in discrete potted modules that are interconnected with the secondary windings of other modules are mounted on high voltage decks and arranged in stacked configuration along the length of the core legs. The secondary windings of each high voltage deck, whose number corresponds to the number of phases of the primary power supply, are connected in four configurations, namely, 30° Z, +15° Z, −15° Z, and Y connections. Three high-voltage decks have their windings connected according to each of these four connection types.

Electron beam welding and heat treatment processes performed for various purposes require power and voltage magnitudes that differ according to the objective. For this reason, a universal power supply for an electron beam gun should be adaptable to produce d.c. power up to the full rated power of the unit over a varying voltage range that is compatible with the metal working process being used. The power supply according to this invention can be readily adapted to deliver d.c. voltage at the full power rating of the primary coil and the core. In the particular application described herein the voltage can be changed in increments of 15 kV from 15 kV to 180 kV. The ease with which the voltage range can be changed is realized by the use of a rotary switch that extends axially parallel to the core legs. Each face of the rotary switch has taps radially extending from the axis of the switch, which can be brought into contact with taps from the circuitry that connects the secondary windings on each high voltage deck. By connecting the several decks in series, parallel, and series-parallel combinations the voltage range can be made to vary without reducing the output power of the transformer.

An electron beam gun must be supplied from a d.c. power supply that has a minimum ripple voltage, preferably less than two percent ripple. Usually a power supply for use with electron beam equipment is energized from a polyphase a.c. motor-generator set. A minimal ripple d.c. output is produced by the power supply according to this invention by including on each high voltage deck full wave rectification bridge circuitry that conducts current in the secondary windings during half cycles. The rectifier output is a unidirectional voltage but not a constant direct voltage. Filters consisting of shunt capacitors that bypass the ripple and series inductors that offer high series impedance to ripple frequencies are conventionally added to smooth the output voltage ripple to acceptable levels. Such filters are not required with this power supply yet the output ripple is less than one-half percent. By eliminiating filter capacitors stored energy is kept low and high voltages arcs (if they should occur at all) are less destructive than if discrete capacitors were present.

The object of eliminating the need for filter capacitors and series inductors is realized because of the unique interconnections made among the secondary windings. The four types of secondary winding connections produce phase shifts of the output voltage wavefrom that operate like polyphase power supply to reduce the undesirable ripple in the output voltage waveform.

An additional means for reducing the voltage ripple on the d.c. output caused by practical differences in wire resistance, small differences in the number of turns of the secondary windings, magnetic stray flux, differences in the forward breakdown voltages of the rectifier, etc., is the use of a compensating circuit to counterbalance the low frequency voltage ripple component. To realize this objective, the ground return lead of the series-parallel connected high voltage modules is interrupted. An a.c. voltage taken from a few windings wound over any of the legs of the transformer core is imposed on the secondary circuit. The core leg from which the compensation voltage is taken and the number of winding turns that determines its amplitude are determined empirically.

A unique construction for modifying C-cores formed of laminated metal and assembling them to produce a three-legged core is disclosed. The core according to this construction or of conventional configuration is cooled by flowing coolant through tubes mounted integrally with the core legs.

DESCRIPTION OF THE PREFERRED EMBODIMENT

Figure 1A:
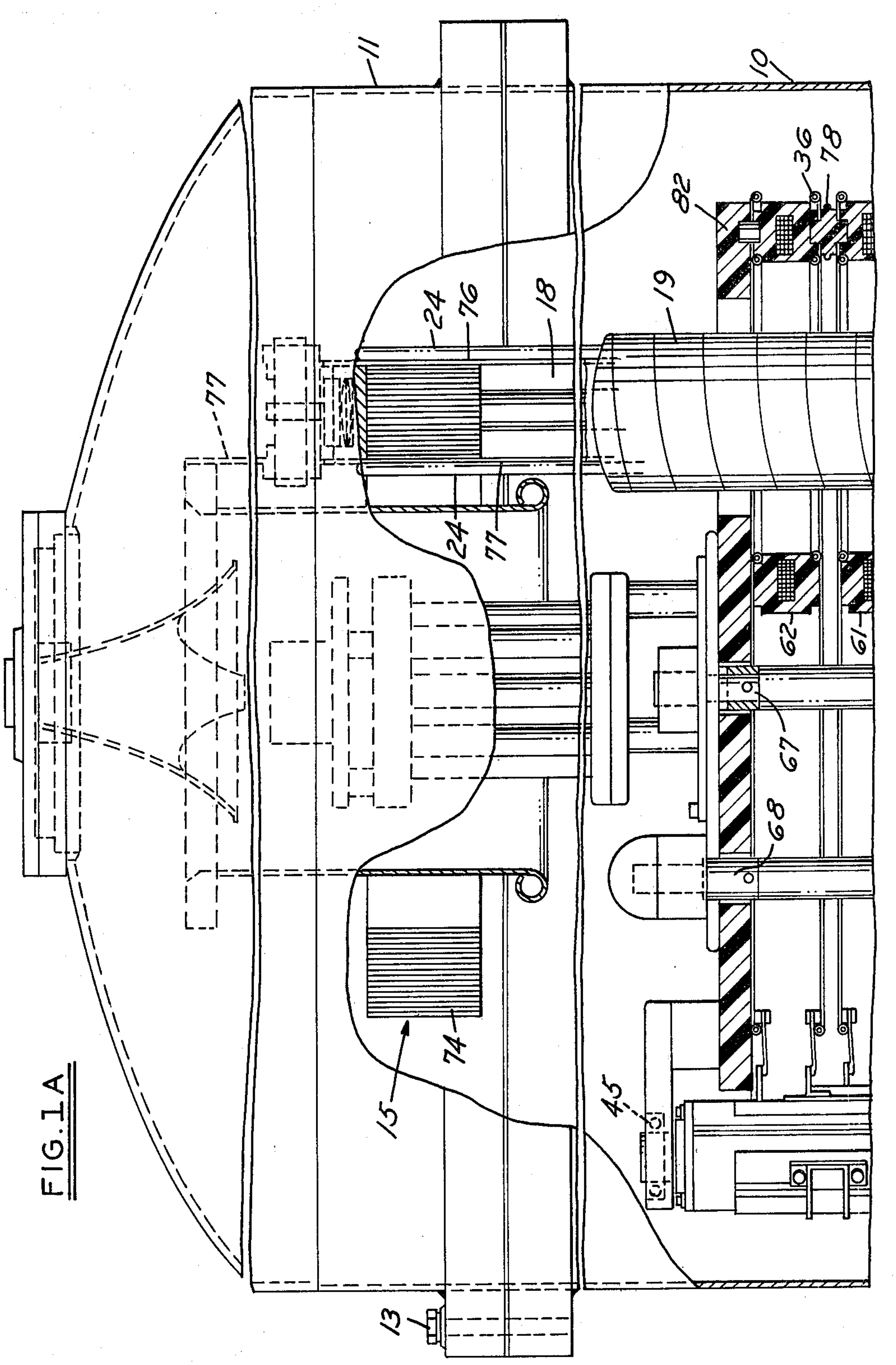
FIGS. 1A–1C when joined along a common axis show an assembled transformer and rectifier set constructed according to my invention illustrating the three-phase, core-type arrangement of the electrical and magnetic circuits, the stacked arrangement of high voltage decks and the rotary spindle switch for interconnecting high voltage decks.

Turning first to FIG. 1, a cylindrical shell casing 10 is joined to an upper head 11 and lower head 12 at its axially opposite ends by mechanical attachments 13, 14 arranged on bolt circle patterns around the cylindrical periphery. An iron core 15 has three legs 16, 17 and 18 that extend axially along the transformer length are connected across the upper and lower ends by iron rings 74, 75 to provide magnetic circuit continuity. The cores and rings in the usual fashion are an assembly of thin iron laminates separated by varnish or an insulating layer of another material to provide a high resistance peripendicular to the direction of the magnetic flux that acts to reduce eddy currents and thus to improve overall efficiency. Each vertical leg of the iron core is surrounded with a primary winding 19–21 the insulation of each turn thereof including enameled paper and mica paper between the lamina.

Electrical energy is supplied to the primary windings 19–21, by braided copper conductors 22, 23 connected to a motor-generator set (not shown). The generator supplies three-phase a.c. power which, in a preferred example, may be at 416 volts, 186 amps per phase and a frequency of 400 Hz. The primary windings 19–21 are delta-connected. The output voltage of the motor-generator set may optionally be controlled via its field current by a feedback loop controlled by the high voltage meter of the high voltage d.c. power supply.

Figure 4A:
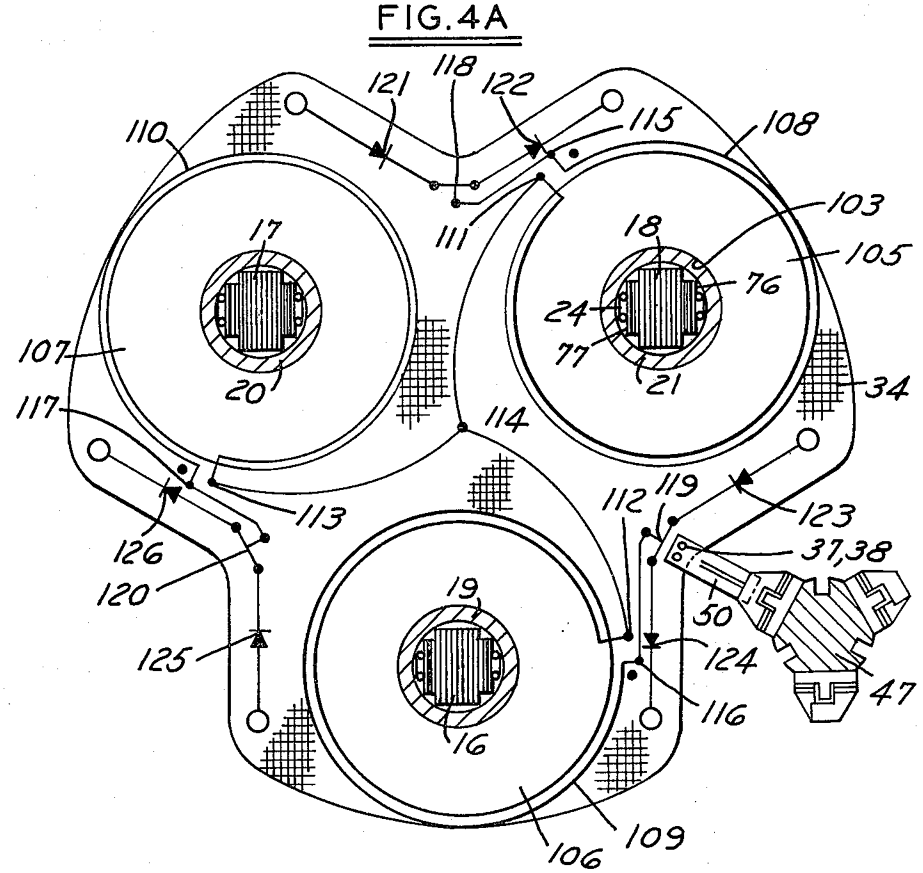
FIGS. 4A–4D are schematic top views of the high voltage decks illustrating the circuitry that connects the secondary winding modules, rectifiers and switching contacts for the +15° Z, −15° Z, 30° Z and Y-connected secondary windings.
Figure 11:
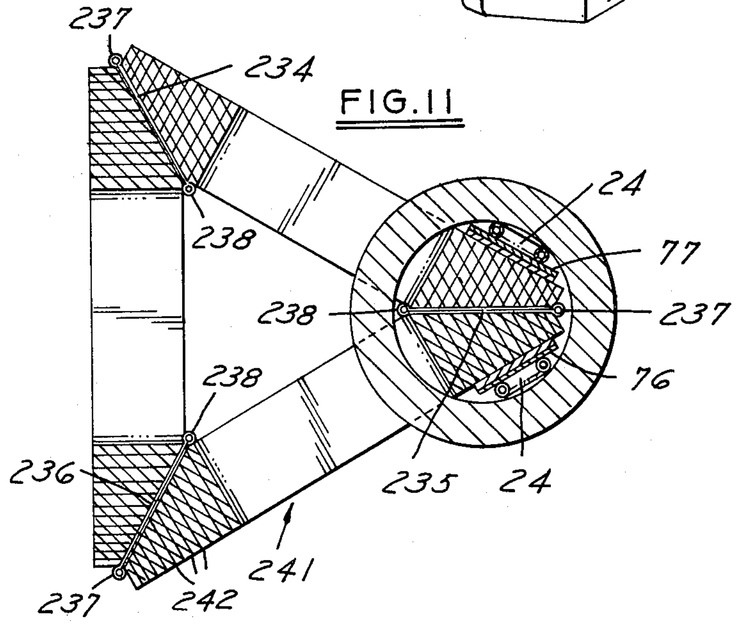
FIG. 11 is a cross section of a core formed of three beveled C-cores assembled to furnish three legs about which the primary circuit is wound.

Coolant is supplied through lines 24, which form a closed loop located in the space between the lateral faces of the iron core legs and the primary windings, as best seen in FIGS. 4A and 11. Coolant lines 24 are soldered to stainless steel metal strips 76, 77 assembled in good thermal contact with the iron core in order to readily conduct heat from the core. The lower head 12 has a central drain plug through which coolant may be drained from the casing. Cooling water flows through the lines at the rate of approximately one-half gallon per minute from a coolant pump (not shown). SF6 gas is cooled in a heat exchanger 49 located in the lower head 12 of the transformer casing, heat exchanger 49 being water cooled in series with coolant lines 24.

Twelve high voltage deck assemblies 25–36 are shown in FIG. 1 stacked one on the other along the axial length of the core legs. Each deck rests on several electrically insulating buttons 78 of material such as Micarta. FIG. 1 shows one of the secondary winding modules 51–62 mounted on each of the high voltage decks. An annular space between the inside diameter of each module and the outside diameter of the primary coil 19 is filled with a gas of high dielectric strength such as SF6. At the outer periphery of the decks 25–36 are electrical contacts 37, 38 mounted on the upper and lower surfaces of the decks, respectively. Contacts 37–38 are connected at one end to the output terminals of the high voltage decks and at the other end by contact springs 50 to contacts 39, 40 that extend radially outward from a rotary switch assembly 41. The maximum potential difference between adjacent decks is only twice the deck voltage, never the full output voltage. Each deck assembly 25–36 includes the secondary coil modules 51–62, rectifiers and two upper and lower metal grid plates 79, 80.

The rotary switch 41, shown in FIGS. 1A–1C and 4A, turns on a shaft 42 which is driven in rotation by an electrical motor 43 whose direction of rotation should not be reversed. The switch is mounted on bearings 44, 45, 48, to permit turning about the axis of shaft 42 and to support and align the shaft. Contacts 39, 40 of switch 41 are mounted by attachment screws 46 threaded into the outer surface of a lobed spindle 47, which is made of an electrical insulation material, preferably a plastic, so that the contacts 39, 40 are electrically isolated from other contacts on the spindle.

Each high voltage deck has three secondary winding modules mounted thereon symmetrically arranged around the axes of the iron core legs 16–18, as seen best in FIG. 4A–4D. The secondary modules 51–62 that are located around leg 16 of the core are shown in FIG. 1 mounted on their respective high voltage decks 25–36 in a stacked vertical arrangement. Each module is mounted on the planar lower metal plate 79 of its corresponding voltage deck and provides a planar upper surface on which the upper metal plate 80 rests. The insulator buttons 78 separate successive grid plates and define a gas space therebetween.

Three tension studs 63–65 of glass fiber reinforced plastic extend axially through clearance holes 66 formed through the voltage decks and have metal studs 67, 68 pinned to their ends, each stud having screw threads formed thereon. When the threads are drawn up, the tension force developed in the studs applies a compression force to the stack of high voltage plates; laminated phenolic plates 81, 82 distribute the clamping forces equally among the high voltage plates. The force operates to hold the upper surfaces of the secondary winding modules in fixed contact with adjacent high voltage deck surfaces.

A laminated lower plate 70 supports the weight of the iron core 15 and primary windings 19–21. Plate 70 is fixed to brackets 71, which are distributed around the circumference of the lower head 12 and are welded to the head 12 of the transmission casing to provide a fixed support for the core and the primary windings and high voltage deck assemblies. Casters 72 are fixed to mounting brackets 73 and welded to the transmission casing, thereby furnishing a movable support for the entire power supply unit.

Figure 2:
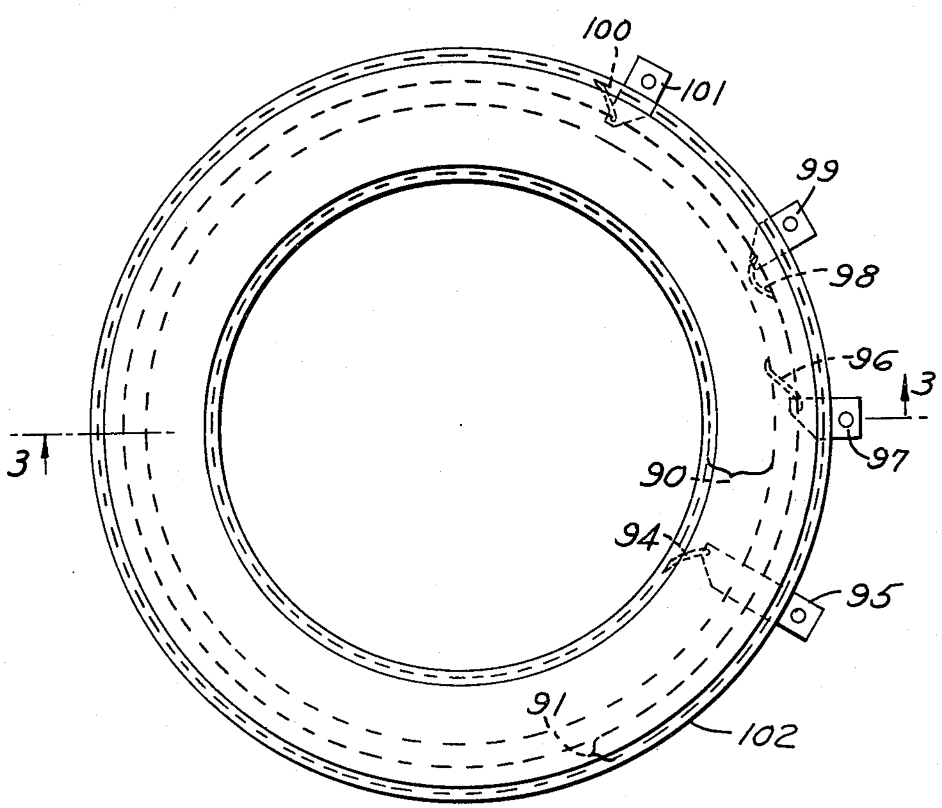
FIG. 2 is a top view of a secondary winding module having coil segments arranged for 15° Z interconnections.
Figure 3:
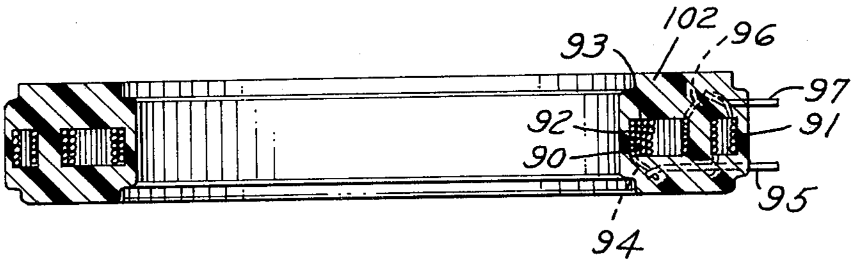
FIG. 3 is a diametrical cross section taken at plane 3—3 of FIG. 2.

FIGS. 2 and 3 show the components from which a typical secondary winding module, in this case a 15 degree Z-connected coil assembly, is made. The coil is formed in two segments, an inner segment 90 and an outer segment 91; each is wound around the central axis, which on assembly is coaxial with the central axis of the primary windings and one core leg. The coils are formed with approximately 25 turns of #24 wire per layer 92. The number of layers of the inner and outer coil segments may vary for each module depending on the desired phase angle of the output for the particular module. In certain modules, in particular those that are Y-connected, the secondary coils will not be wound in discrete segments but will have one continuous secondary coil comprising radially stacked layers of approximately 25 turns per layer. The 30° Z-connected secondary coil modules have inner and outer coil segments that have approximately the same number of turns. Each layer of wire 92 is insulated from other wire layers by wrapping a suitable thickness of insulation 93 around its outer periphery before the next layer of wire is coiled. The insulation may have adhesive applied to one side; the adhesive may be cured at elevated temperature to form a bonded coil pack.

The first turn at the radially innermost layer of the inner coil segment 90 provides a lead wire 94 connected to a first tap 95 that extends radially outward from the module assembly. The outer end of the inner segment 90 provides a lead wire 96, which is connected to a second tap 97 that extends outwardly from the module. Similarly, the first turn at the radially inner end of the outer secondary coil segment 91 provides a lead wire 98 connected to a third tap 99 that extends beyond the outer circumference of the module. The last turn of the outer segment 91 is connected by lead wire 100 to a similarly located fourth tap 101. The taps and bonded coils are inserted in a casting mold. The mold is charged with quartz-filled epoxy resin 102 which has provision for the several taps to protrude from its outer surface. The resin is cured around the coils and inner ends of the taps and has an outer contour providing planar surfaces on which the module may be mounted on a lower grid plate 79 and the deck assemblies may be stacked.

The inner and outer coils of the secondary winding modules are connected to produce the different coil connections. Except for the Y-connected secondary windings the other module types have inner and outer coil segments as described with respect to FIGS. 2 and 3. In the construction of which FIGS. 2 and 3 are exemplary wherein each module has two coil segments, four external taps 95, 97, 99, 101 are required and the connections among those taps and the taps of other modules on a particular high voltage deck are as described with respect to FIGS. 4B–4D. However, with the Y-connected secondary coil only a single coil element is provided, the inner end of which is connected to a first tap that extends radially outward beyond the outer contour of the epoxy molding. The outer end of the Y-connected secondary winding module is connected to a second tap that is accessible for connection to other Y-connected modules of a particular high voltage deck as illustrated in FIG. 4A. Of course, the Y-connected secondary winding modules may be fabricated with inner and outer coil segments provided the last turn of the inner segment is connected to the first turn of the outer segment.

Figure 1B:
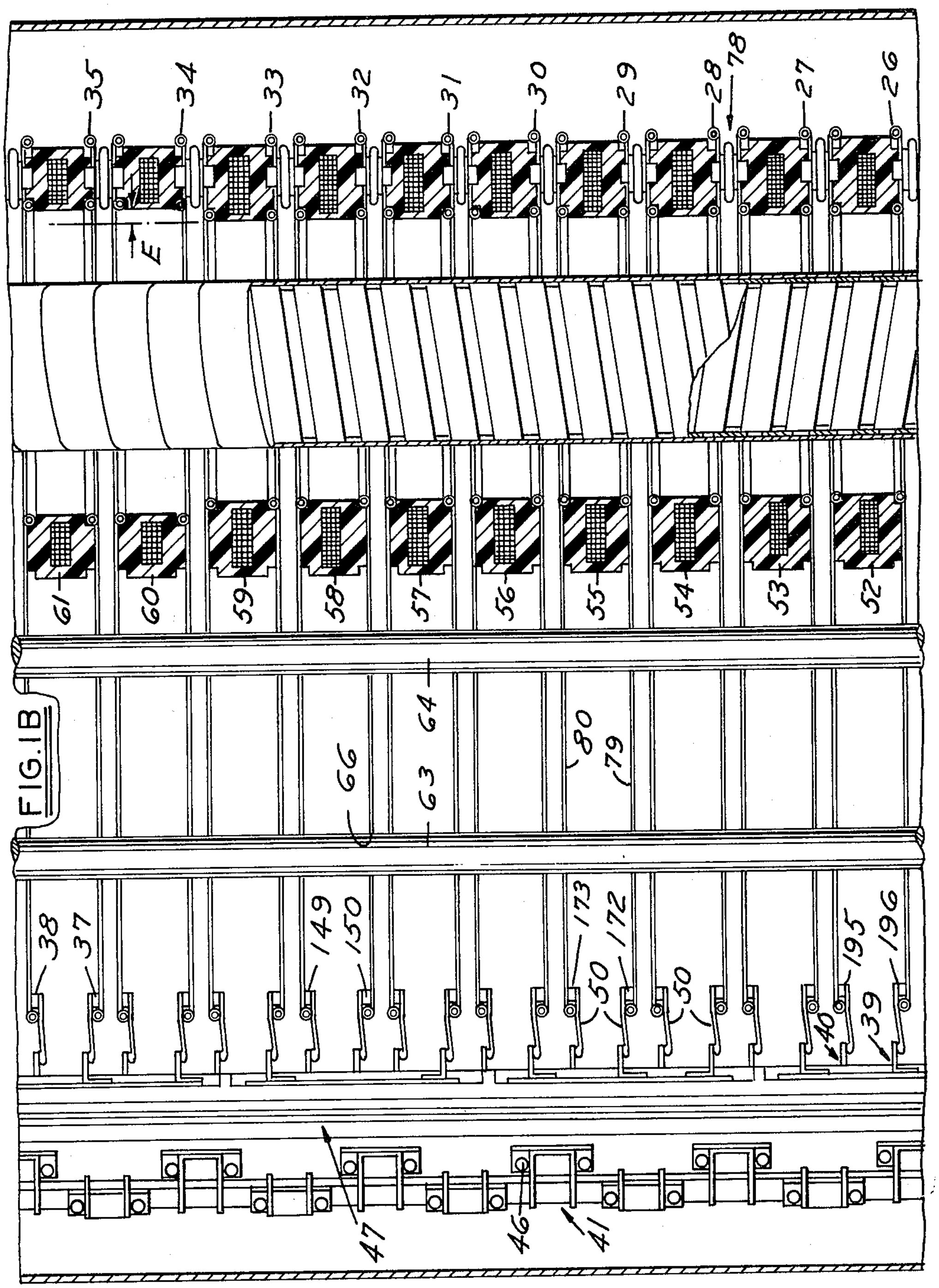
Figure 1C:
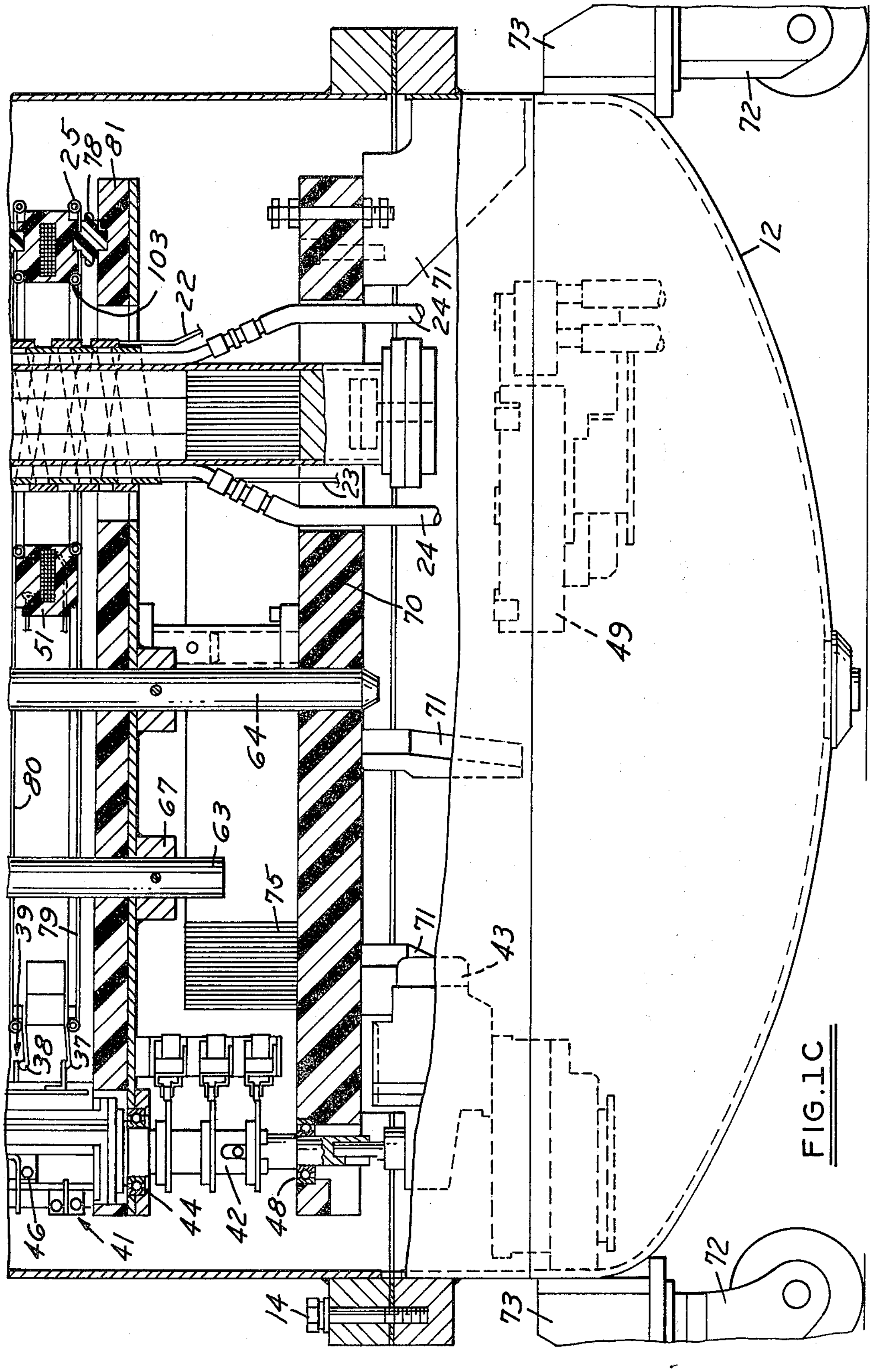

The total number of turns of the Y-connected windings is less than that of the Z-connected coils. Advantage of this fact is taken by making the inner diameter of the Y-coils larger than that of the Z-coil. By locating the Y-coils at the upper end of the stack an additional clearance E is obtained at the highest voltage region of the stack as seen in FIG. 1B. Conversely, this permits a closer coupling or smaller diameter of the Z-coils located further down on the stack where the d.c. voltages are much less than the output voltage.

Figure 5A:
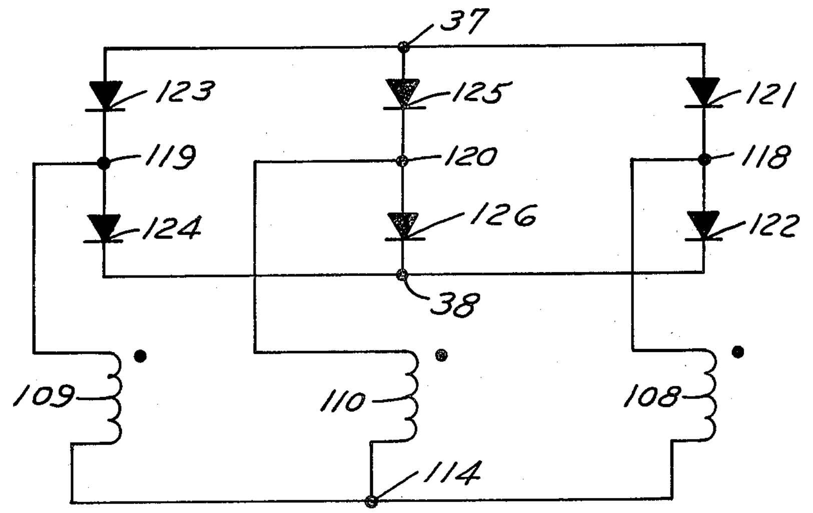
FIGS. 5A–5D show the circuit diagrams of the secondary winding segments, rectifiers and contacts for the +15° −15° Z, 30° Z and Y-connected secondary windings.
Figure 5B:
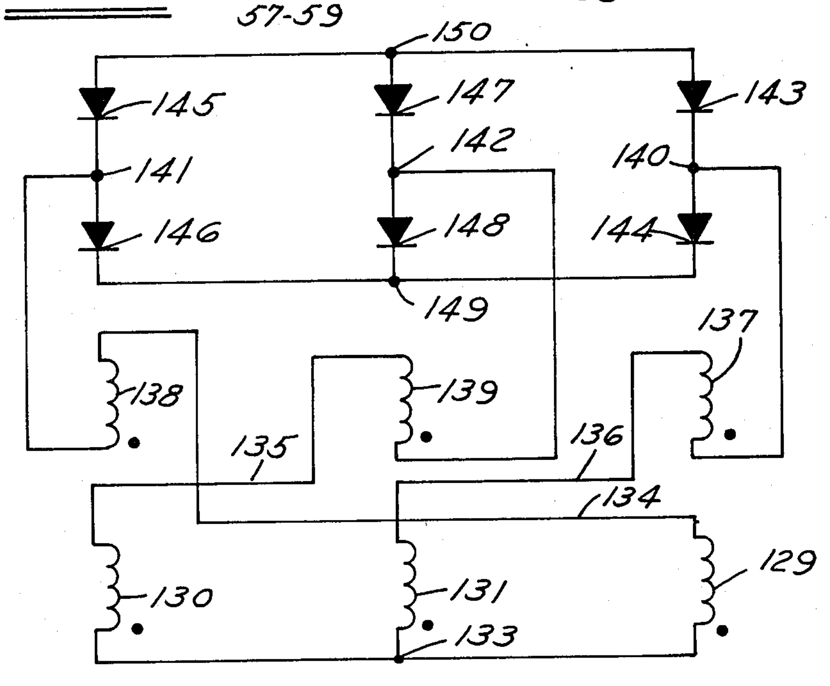

The interconnections among the three secondary winding modules of a particular high voltage deck assembly 34–36 made to produce a Y-connected secondary winding are shown in FIGS. 4A and 5A. Primary windings 19–21 are wound around three legs 16–18 of the core. A high voltage deck 34 has three lobes each with a circular hole formed through its thickness to accommodate the primary windings and the core legs. The construction of voltage deck 34 is identical to that of voltage decks 35 and 36 which are arranged on the pole legs at the upper end of the stack. Each of these voltage decks 34–36 has three Y-connected secondary winding modules 105–107 mounted thereon, the first turn of each coil being connected to the first turn of the other coils at a common node 114. The final turn of each secondary coil is led out from the modules 105–107 to outer taps 115–117, which are connected by lead wires to nodes 118–120 located respectively between recitifers 121 and 122, 123 and 124, 125 and 126. Rectifiers 122, 124, 126 are mutually connected by a lead to the lower contact 38 that is presented to the rotary switch for selective engagement by the outwardly extending contacts of the switch assembly 41. Similarly, rectifiers 121, 123, 125 are connected by a lead to the contact 37 mounted on the upper surface of the deck 34. The spindle 47 rotates to the position that will produce the desired series-parallel interconnection of the decks 25–36, the switch assembly having contacts 39, 40 that engage contacts 37, 38 mounted on the upper and lower surface, respectively of the high voltage decks 25–36.

The secondary induced voltage is produced by the same flux as the primary induced voltage. For a coil combination located on two of the legs and connected in series, the induced voltage is either in phase or out of phase with the primary voltage depending on the manner in which the coils are wound on the core. In order to be specific in this regard, dots are placed near the terminals in FIGS. 4 and 5 in the customary manner to indicate that the induced voltage rises in the primary and secondary winding are in phase when both are defined as voltage rises from the undotted to the dotted terminal.

Three high voltage decks 31–33 have their secondary windings connected in a +30° Z connection. To produce this connection, as is best shown with reference to FIGS. 4B and 5B, the final turns of the inner coil segments 129–131, which may have approximately 432 turns, are brought out from the winding modules and are mutually connected at a common node 133. The first turns of the inner winding segments 129–131 are connected by lead wires 134–136 to the first turns of the outer winding segments 137–139, which have the same number of turns as the inner winding segments, but are located on another one of the core legs. The final turn of the outer winding segments are connected to nodes 140–142 located respectively between rectifiers 143 and 144, 145 and 146, 147 and 148. A lead connects the output of rectifiers 144, 146, 148 to the contact 149 that is presented to the contacts of the switch assembly 41. Similarly, a lead connects the rectifiers 143, 145, 147 to the contact 150.

Figure 4B:
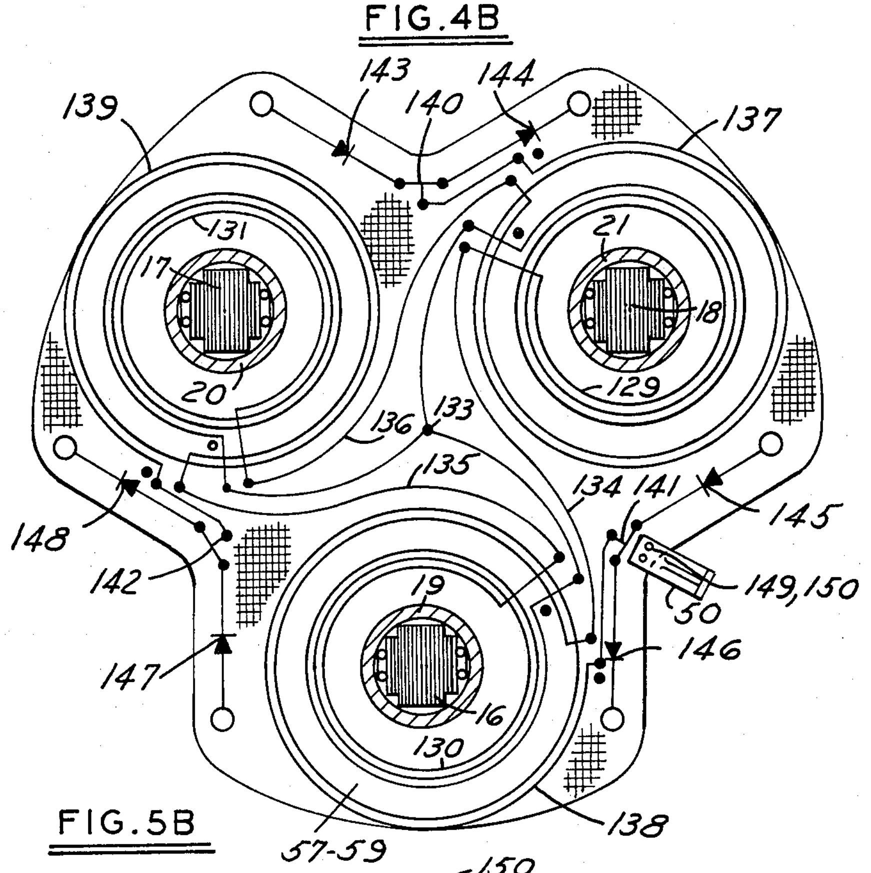
Figure 4C:
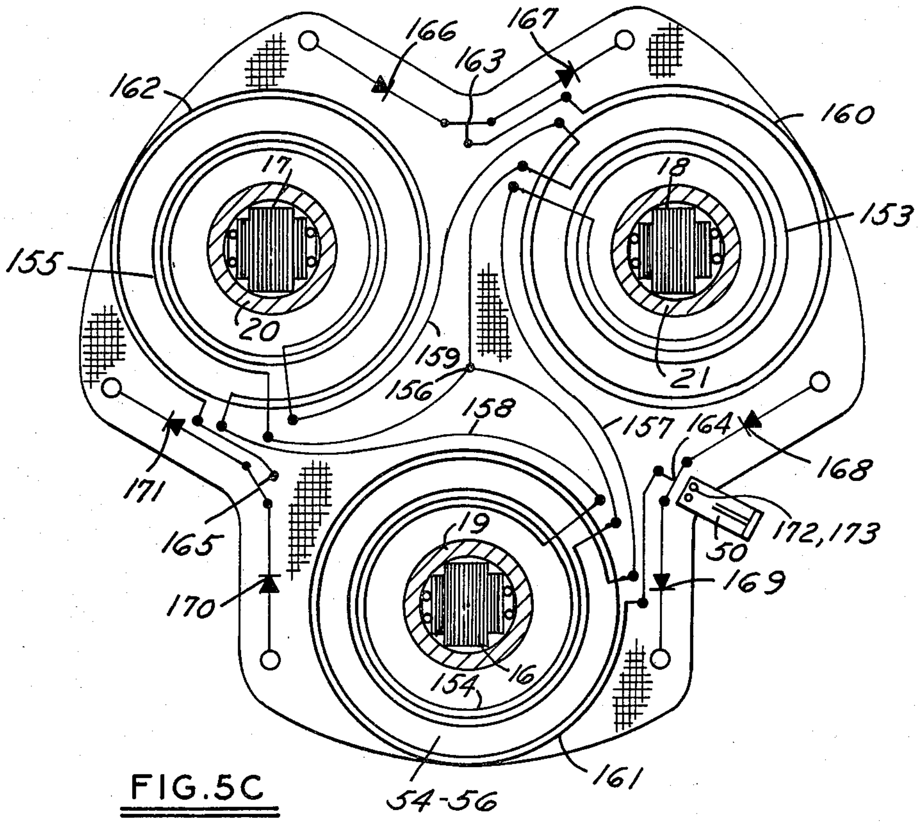
Figure 5C:
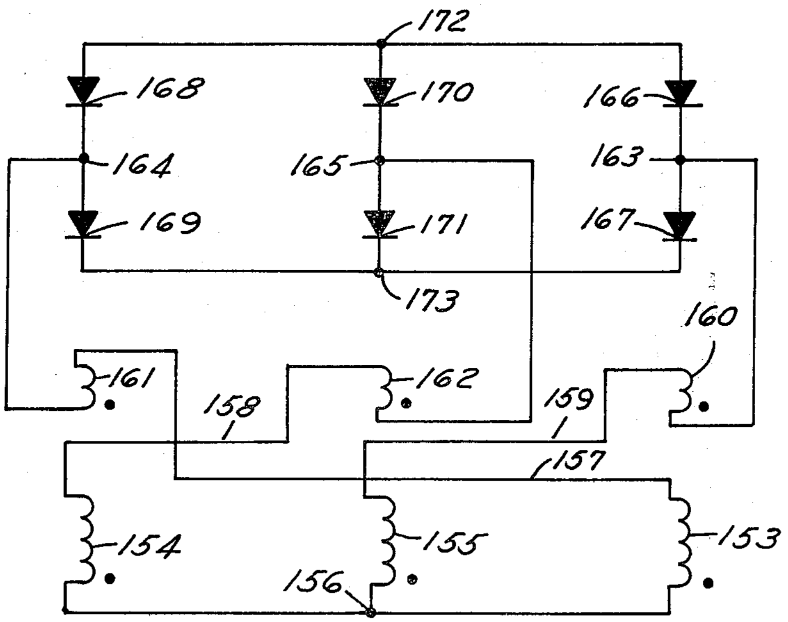

Each of the high voltage decks 28–30 has three secondary winding modules 54–56 mounted respectively thereon as in FIGS. 4C and 5C to produce a ±15° connection. Each module has an inner coil 153–155 of approximately 648 turns and an outer coil 160–162 of about 240 turns. The outermost turn of the inner coils are connected to a common node 156. Leads 157–159 connect the inner ends of the inner coils to the inner ends of the ouer coils of successive modules on the decks 28–30. The outer ends of the final turn of the outer coils 160–162 are connected to the nodes 163–165 located respectively between rectifier pairs 166 and 167, 168 and 169, 170 and 171. The output of rectifiers 167, 169, 171 are connected by a lead to the contact 173 on the upper surface of the deck and the end of the rectifiers 166, 168, 170 are connected to the contact 172 mounted on the lower deck surfaces.

The connections made among the secondary winding modules on the +15° Z-connected high voltage decks are essentially the same as those of the 30° Z-connected decks except that the number of turns of the inner and outer secondary coil segments are not equal. The inner segments have about 648 turns and the outer segments 240 turns, whereas on the +30° Z high voltage decks the inner and outer segments each have 432 turns.

Figure 4D:
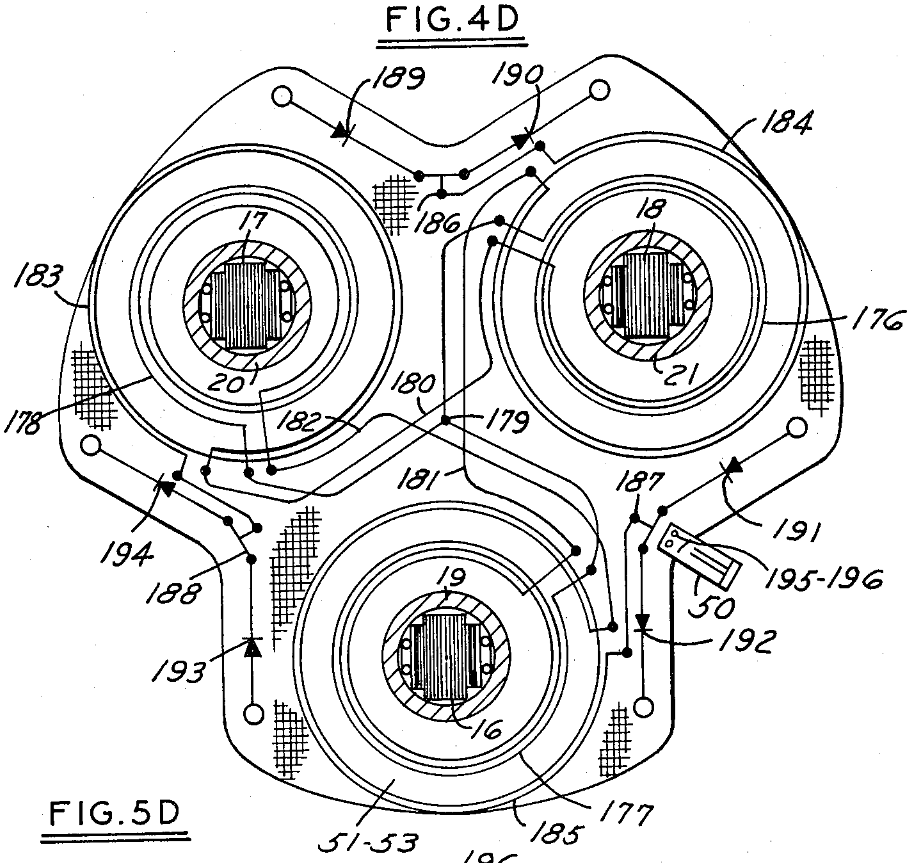
Figure 5D:
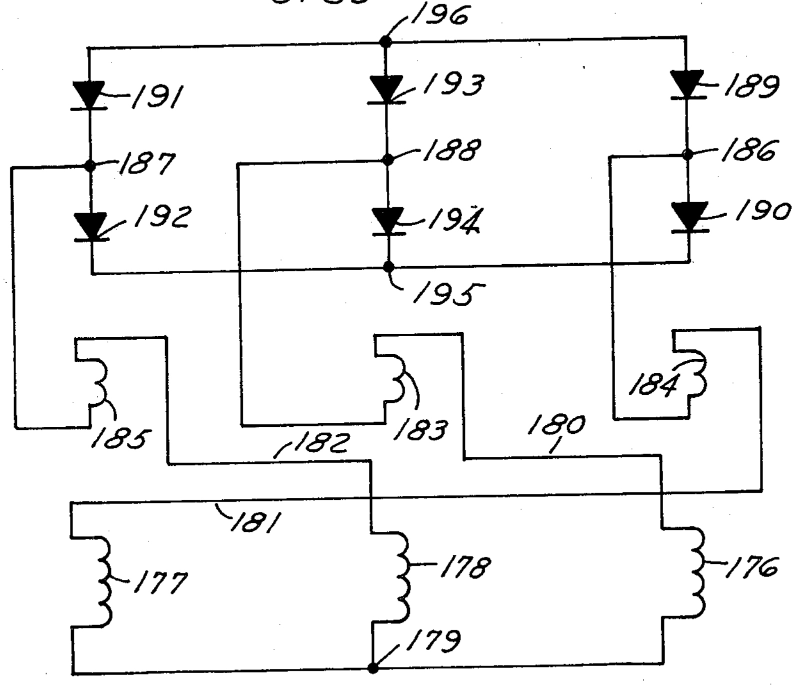

Three high voltage decks 25–27, have the secondary windings arranged in a −15° Z connection. FIG. 4D shows the components of high voltage deck assembly wired to produce this connection and FIG. 5D shows the circuit diagram for this connection. The high voltage end of the inner coil segments 176–178 are connected to a common node 179. The first turn of the inner coil segments are connected by lead wires 180–182 to the low voltage end of the outer coil segments 183–185, respectively. The final turn or high voltage end of the outer coil segments is connected to nodes 186–188 that are located, respectively, between rectifier pairs 189 and 190, 191 and 192, 193 and 194. A lead connects the output of rectifiers 190, 192, 194 to the contact 195 and a lead connects rectifiers 189, 191, 193 to the contact 196 on the high voltage deck that is selectively engaged by a contact on the rotary switch assembly 41.

FIG. 4A shows a transverse cross section of the rotary switch 41 that includes an axially extending spindle 47 having three planar surfaces formed thereon that extend along its length. Each surface has a plurality of terminals 39, 40 mechanically attached and extending radially outward from the axis of the spindle. Depending on the longitudinal position of the switch contacts 40 in relation to the spring contacts 50 on the high voltage decks, rotation of spindle 47 will bring the contacts 40 into engagement with the contacts 50 of selected high voltage decks. In this way, a series, parallel, or series-parallel combination of the d.c. voltages of the high voltage decks can be made.

Figure 6:
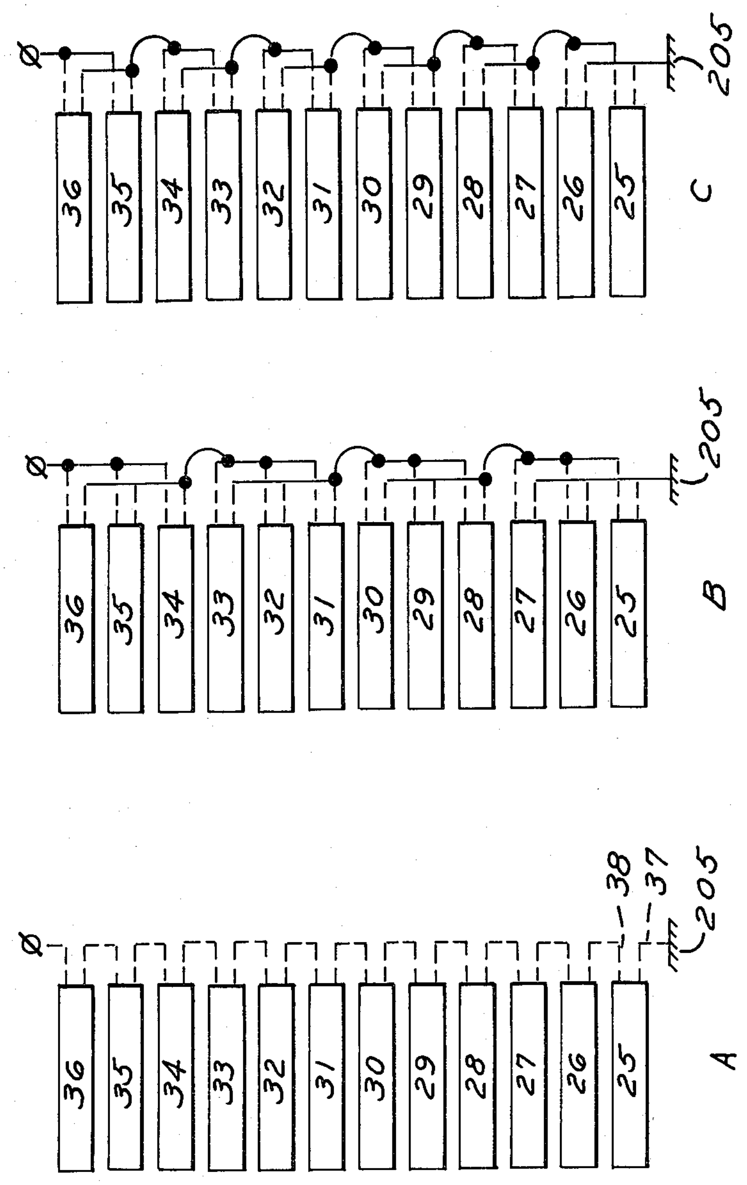
FIG. 6 shows schematically the series-parallel interconnections made by the rotary switch among the high voltage decks for producing a range of output voltage and current magnitudes at full rated power.

Examples of the interconnections that are possible by way of a rotary switch of this kind are shown schematically in FIG. 6. When the contacts 40 mounted on one planar face of spindle 47 are rotated to produce a series connection among the contacts, as shown in FIG. 6A, the output from the power supply can be made to deliver 600 mA at 180 KV.

The secondary voltage is produced in a series of twelve high voltage decks 25–36 having three coil modules each with full wave rectification. Each deck produces 15 kV d.c. at 600 mA when the primary winding is energized from a three-phase source at 416 V and 186 A per phase. If the decks are connected in a proper series-parallel combination, voltages from 15 kV to 180 kV d.c. can be obtained in increments of 15 kV at the full rated power of the primary coil and core. For instance, with the output terminals of the twelve high voltage decks 25–36 connected in series, the transformer will delivery 180 kV at 600 mA. If adjacent pairs of high voltage deck terminals are connected in parallel and the six pairs are connected in series, the output will be 1.2 A at 90 kV.

FIG. 6C shows high voltage decks 25 and 26 connected in parallel and this pair connected in series with the parallel connected deck pair 27, 28. This connection procedure continues with parallel-connected pairs being formed of decks 29 and 30, 31 and 32, 33 and 34, 35 and 36. Interconnections are made among the pairs by the rotary switch assembly 41 to produce the requisite output. Alternatively, if three decks, for example, 25, 26, 27, are connected in parallel-connected triplets and the triplets are connected in series, the output will be 1.8 amps at 60 kV.

FIG. 6B shows an arrangement that continues in this way wherein triplets are formed of the decks 28, 29 and 30; 31, 32 and 33; 34, 35, and 36. Series connections are made among the triplets when the rotary switch is rotated to a third position, the other two positions having produced the interconnections of FIGS. 6A and 6C. Of course, other series-parallel combinations of high voltage decks are possible. For example, a parallel-connected sextruplet formed of high voltage decks 25–30 can be connected in series with another parallel-connected sextruplet formed of decks 31–36. The output in this instance will be 3.6 A at 30 kV.

As can be seen from FIGS. 4 and 5 each of the three phase, secondary voltage modules of this power supply operates with full wave rectification. If the frequency in the primary windings 16–18 is 400 Hz, the power supply generates a voltage ripple on its d.c. output at a frequency of 2400 Hz. However, if the three secondary coils differ physically or electrically, for example in the number of turns, in wire resistance or regarding stray magnetic flux, a 400 Hz component remains superimposed on the output. The high voltage rectifiers may have differences in their forward breakdown voltages, which differences may be in the order of several volts, or have differences in their internal resistance. Variations among the functional characteristics of the rectifiers will contribute to the imbalance that produces the 400 Hz component on the output.

The four sets of secondary core modules that have Y, 30° Z, +15° Z and −15°-connected secondary windings produce output voltages that are phase shifted with respct to one another because of the differences in the connections. For example, the output from a Y-connected secondary will be 30 degrees out of phase with respect to a delta-connected secondary. By interconnecting the output contacts of the various high voltage deck sets, the magnitude of the ripple voltage is reduced because of the cancellation effect of the phase shifting and the ripple voltage has a higher frequency than if the modules were identically connected. For example, if four differently connected groups of secondary coil modules are connected in series and the three high voltage decks of each connection type are connected in parallel, the highest ripple frequency is 9600 Hz output voltage. The higher the frequency of the ripple voltage the better able is a discrete capacitor, or the capacitive effect of the high voltage cable, to smooth the ripple. The lowest frequency, specifically the frequency of the primary power source, is therefore the least desirable for purposes of eliminating the ripple.

Figure 7:
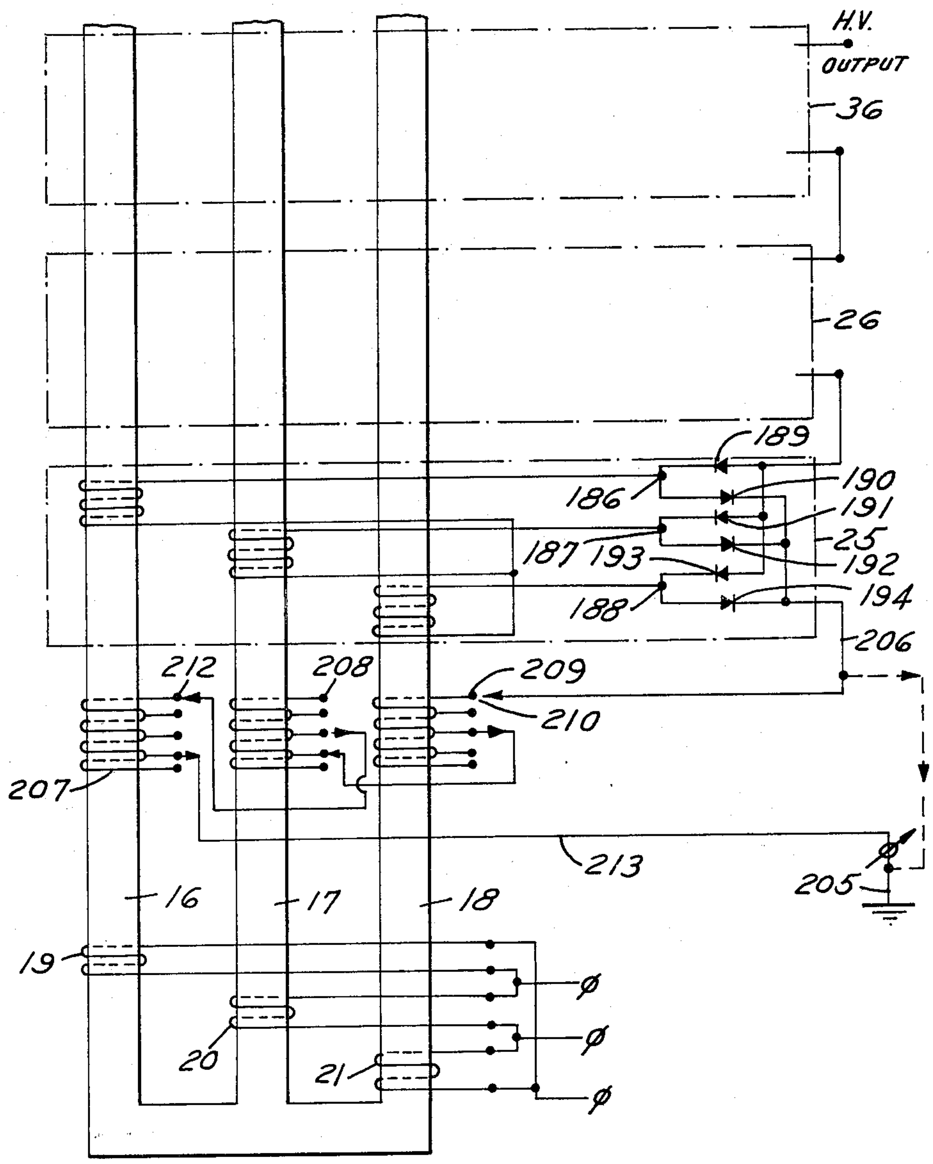
FIG. 7 is an elevational view schematic of another arrangement of the circuits showing the transformer cores with primary windings, secondary coils and rectifier sets forming the individual high voltage deck assemblies. An optional set of compensating coils is wound over any or all of the iron core legs.

To counterbalance the low frequency voltage ripple component, the ground return lead 206 of the series-parallel connected high voltage modules is interrupted as shown in FIG. 7. The three iron core legs 16–18 have their primary delta-connected windings 19–21 supplied with power from a 420 volt, 400 Hz source for purposes of this illustration. To counterbalance the voltage ripple, an a.c. voltage of proper phase and amplitude is imposed. This voltage is taken from a few turns of windings 207–209; the actual number will be determined empirically but should vary between one and eight turns. Each winding 207–209 is wound over the three legs 16–18 of the transformer core forming an additional winding, but one completely independent of the primary and secondary windings. The magnitude of the counterbalancing voltage will vary according to the number of winding turns from which it is taken and according to the particular core leg or group of core legs from which it is taken. In order to vary these parameters, the individual turns of these compensating windings 207–209 are brought out to three terminals 210–212 which can be connected at random, as FIG. 7 shows schematically. The d.c. current in these counterbalance windings has a magnitude that will vary between 0.1 and 1.0 amps. The primary current in each phase is in the range 90–180 amps; therefore, even the largest compensating coil current, one amp-turn, is of little consequences compared to the primary winding current. The output from the compensating windings is carried by lead 213 to the ground connection 205.

Voltage components having frequencies greater than the frequency in the primary windings, which in this case is considered 400 Hz, may be compensated by putting a frequency doubling circuit in series with each compensation coil. A phase shifting network could be added to fine tune the compensation effect either separately or in combination with the compensation coils. The ripple compensation circuitry corrects the residual 400 Hz ripple in the d.c. voltage output for any output voltage of the power supply. Since it is proportional to the primary input voltage, the required compensation voltage depends to some extent on the magnitude and nature of the load connected to the output of the power supply. However, the compensation voltage can be readily optimized empirically for any given load.

The inherently low a.c. ripple on the d.c. output of a 400 Hz system is reduced by the phase-shifted output from the multiple deck circuitry and can be further reduced by the compensating circuits as described. Employing phase-shifting and compensating techniques allows the ripple to be reduced to an extremely low value without the use of discrete capacitors. Moreover, the deck circuitry does not include inductors nor any more rectifiers than a conventional circuit having one high voltage a.c. terminal connected to one high voltage rectifier chain.

Figure 8:
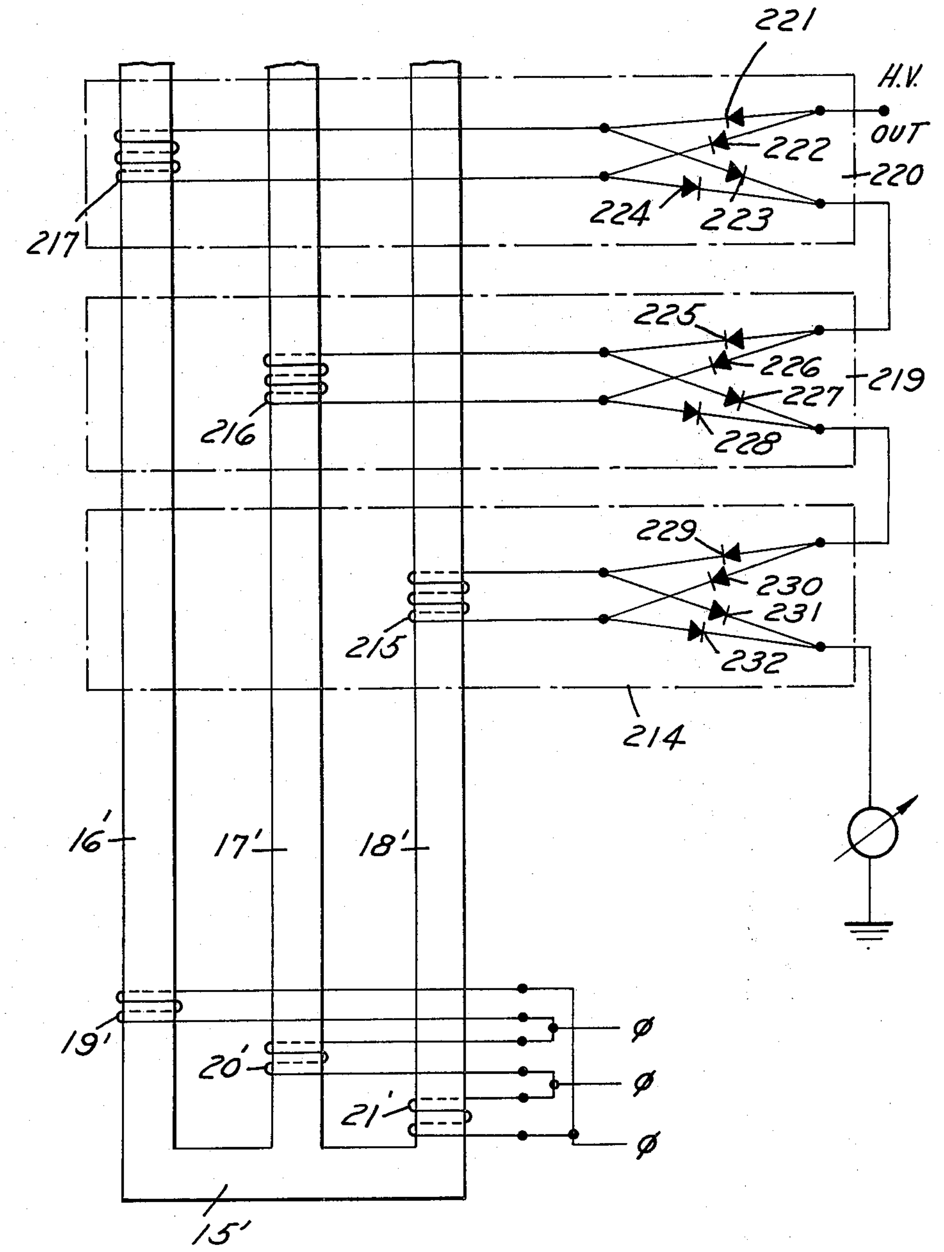
FIG. 8 shows a circuit wherein each high voltage deck has only one secondary coil and four rectifiers for full-wave rectification. The coils on successive decks are located around different core legs of the same 3-phase transformers shown in FIG. 1. Ripple compensating coils identical to those to FIG. 7 are optional.

The power supply according to my invention can be adapted to a lower power range at the same high d.c. voltage by reducing the number of secondary winding modules that are placed around the legs of a core-type transformer. FIG. 8 shows an arrangement wherein the iron core 15' has three legs 16'-18' extending axially, each leg wound with a primary winding 19'-21' in this case, however, each voltage deck 214 has only one secondary winding potted within an epoxy-base module 215 and arranged around only one leg, for example 18', of the iron core. The next high voltage deck 219 in the stack has the secondary winding of module 216 co-axially wound around a second leg 17' of the iron core. A third high voltage deck 220 in the stack has a secondary winding module 217 aligned coaxially with the third leg 16' of the iron core. Rectifier diodes 221-232 are connected as shown on the upper surfaces of the high voltage decks. Inner and outer secondary coils of the secondary winding modules 215-218 ca be connected to produce ±15° Z, 30° Z and Y connections. Interconnections are made among the decks by connecting the output terminals by a rotary switch device of the type previously described or by permanently wiring for the desired output voltage.

Figure 9:
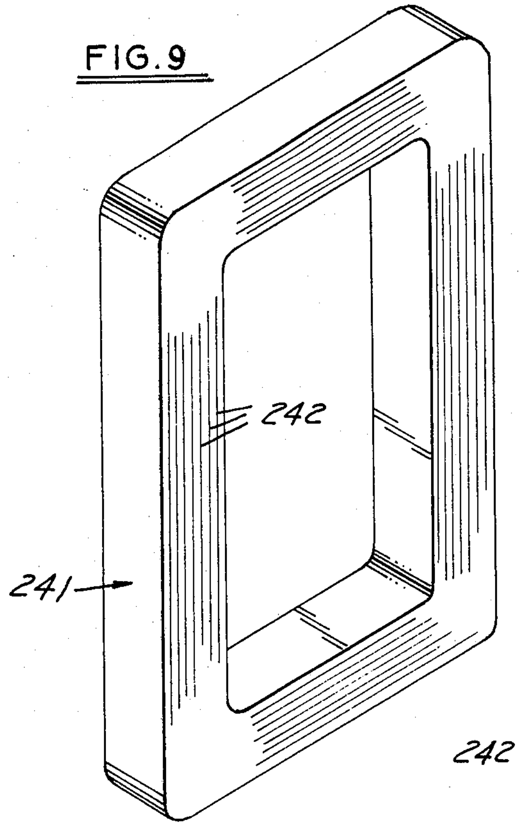
FIG. 9 is an isometric view on a C-core formed of lamina of magnetic material.
Figure 10:
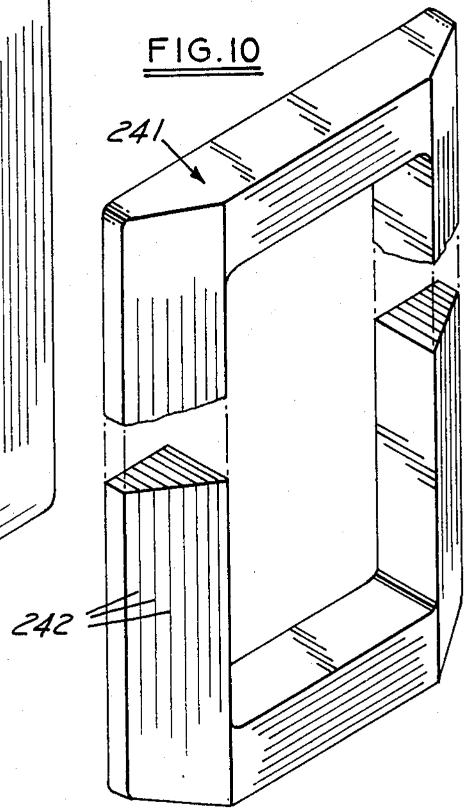
FIG. 10 shows isometrically the C-core having beveled corners formed along the longitudinal legs at one face.

The core structure shown in FIGS. 9-11 is constructed for use with the transformer of this invention but according to a design alternative to the one of FIG. 1 wherein two rings and three upright core legs were joined. The C-core 241 of FIG. 9 is of conventional construction formed from iron lamina 242 would one over the other to form a rectangular ring. The C-core 241 is shown in FIG. 10 with the corners of the legs having a 30 degree bevel or chamfer. Three chamfered C-cores are joined along the planes formed by the bevels as in FIG. 11. Alternatively, lamina of varying width can be laid in a stack, thus avoiding the chamfering process.

Water cooled plates 234-236 are similar in construction and function to plates 76, 77, but are arranged differently because of the different more construction. Water coils 237-240 are attached to the plates 234-236 facilitate heat exchange away from the core legs. This core construction could be used in the structure of FIG. 1 as an alternative.

This construction has the advantage that C-cores can be wound on conventional winding machines. The laminations of the core do not have equal width but the width changes as shown in order to fill as completely as possible the available roughly circular cross section inside the primary coil and also to leave room for the water cooling strips which conduct heat from the core. This arrangement has the advantage that it permits the core to be driven at very high induction levels, perhaps 16 to 20 kilo Gauss, yet the core power losses are removed and a very high voltage per turn is achieved on account of the high induction and the large iron core section. Because of the higher voltage per turn, fewer turns are needed, thus reducing the electrical resistance of the coils and thereby the copper losses. Core cross section and water cooling are an essential factor in realizing good efficiency from the transformer.

The multiple voltage output capability of a unitary coil and rectifier assembly is of considerable economical importance since it permits use of a single standard unit for multiple purposes. It is not necessary, however, to incorporate a switch in each power supply; a single purpose unit can be permanently wired for the desired output voltage.

Having thus described the preferred embodiments of my invention, what I claim and desire to secure by U.S. Letters Patent is:

1. A transformer for converting a polyphase a.c. electrical power supply to a d.c. power source comprising:

- a core having a plurality of legs, the plurality corresponding in number to the number of phases of the power supply;
- a primary winding having a portion thereof wound around each of the core legs;
- a secondary circuit magnetically coupled to said primary winding having segments thereof connected to produce a phase shift of the output voltage with respect to the output voltage of other secondary circuit segments;
- means adapted to rectify the output voltage of said secondary circuit segments whereby a d.c. voltage is produced;
- means interconnecting the output of said secondary winding segments whereby power is supplied to the load at a voltage whose magnitude depends on the interconnections made among the secondary winding segments.

2. The transformer defined in claim 1 wherein said core forms a magnetic circuit having a plurality of legs cooled by coolant flowing within ducts adapted to absorb heat from the core legs.

3. The transformer defined in claim 1 wherein said core is formed from a plurality of C-core segments.

4. The transformer defined in claim 1 wherein said core is formed from a plurality of rectangular rings formed of laminated magnetic material, each ring having two longitudinal legs, one longitudinal leg of two rings being joined along a common longitudinal plane, the other longitudinal leg of the two rings being joined to the two longitudinal legs of another ring along a common longitudinal plane.

5. The transformer defined in claim 3 wherein the legs of the C-core segments are formed with bevel surfaces extending along the longitudinal legs, one longitudinal leg of two C-core segments being joined along a common longitudinal plane, the other longitudinal leg of the two C-core segments being joined to the two longitudinal legs of another C-core segment along a common longitudinal plane.

6. The transformer defined in claim 1 wherein said primary winding is delta-connected, each leg of the delta being wound over a core leg, the polyphase power supply being a three phase supply.

7. The transformer defined in claim 1 wherein said secondary circuit includes a plurality of coiled wire segments, at least one segment being disposed coaxially about each core leg.

8. The transformer defined in claim 7 wherein said secondary circuit wire segments are arranged in groups of three, at least some of said segments having portions thereof interconnected with the portions of the segments of a group to produce a Y-connected group.

9. The transformer defined in claim 7 wherein said secondary circuit wire segments are arranged in groups of three, at least some of said segments having portions thereof interconnected with the portions of the segments of a group to produce a +15° Z-connected group.

10. The transformer defined in claim 7 wherein said secondary circuit wire segments are arranged in groups of three, at least one of said segments having portions thereof interconnected with the portion of the segments of a group to produce a −15° Z-connected group.

11. The transformer defined in claim 7 wherein said secondary circuit wire segments are arranged in groups of three, at least some of said segments having portions thereof interconnected with the portion of the segments of a group to produce a +30° Z-connected group.

12. The transformer defined in claim 1 further comprising high voltage deck assemblies including:

upper and lower grid plate pairs electrically insulated and spaced from one another;

secondary winding modules having said secondary circuit segments cast therewithin, the modules being mounted between the upper and lower grid plates of a pair;

said rectifier means being disposed between said upper and lower grid plates of a pair; and an output contact associated with each high voltage deck adapted for selective interconnection with the contacts of other high voltage decks whereby an output voltage is produced whose magnitude depends on the interconnections made among the secondary winding segments.

13. The transformer defined in claim 12 wherein the secondary winding modules are mounted in groups of three on each high voltage deck, the secondary winding segments of a group having portions thereof interconnected with the portions of the segments of other members of the group to produce a phase shift of the output voltage of the group with respect to the output voltage of other groups.

14. The transformer defined in claim 8 wherein said secondary circuit segment groups are stacked along the axis of said core legs, said Y-connected group is located at the high voltage end of the stack and said Y-connected group is spaced from said core legs a distance that is greater than the spacing of other groups from said core legs.

15. The transformer defined in claim 1 wherein said rectifying means includes rectifier bridge circuitry connected between the high voltage end of said secondary winding segments and said interconnecting means, whereby full-wave rectification of the secondary voltage is produced.

16. The transformer defined in claim 15 wherein said rectifier bridge circuit includes no discrete capacitors.

17. The transformer defined in claim 1 wherein said interconnecting means connects the segments of said secondary winding in series, parallel or series parallel combinations.

18. The transformer defined in claim 1 further comprising compensation means for reducing the voltage ripple at the secondary circuit output including compensation windings wound over the legs of said core, interconnected to produce a selected phase shift of its output voltage, having a selectable number of turns that determines its voltage magnitude, said compensation windings being interposed between the ground return lead of the said interconnecting means and the secondary circuit windings.

* * * * *